Sept. 29, 1942.   J. E. RAINWATER   2,297,164
PIPE REPLACING APPARATUS
Filed July 1, 1941   2 Sheets-Sheet 1

Inventor
JOHN E RAINWATER

By Semmes, Keegin, Beale & Semmes
Attorneys

Sept. 29, 1942.                J. E. RAINWATER                2,297,164
                            PIPE REPLACING APPARATUS
                              Filed July 1, 1941            2 Sheets-Sheet 2

Inventor
JOHN E. RAINWATER
By Semmes, Keegin, Beale & Semmes.
Attorneys

Patented Sept. 29, 1942

2,297,164

UNITED STATES PATENT OFFICE 2,297,164

PIPE REPLACING APPARATUS

John E. Rainwater, Cedartown, Ga., assignor of one-half to Daniel L. Roberts, Jr., Cedartown, Ga.

Application July 1, 1941, Serial No. 400,655

6 Claims. (Cl. 254—29)

This invention relates to an assembly for pulling and replacing pipes by means of a cable, and more especially to a device attached to the cable by means of which a pipe may be pulled and replaced.

One of the objects of this invention is to provide an assembly for renewing conduits such as pipe.

Another object of this invention is to provide an assembly including a cable by means of which old pipes may be pulled and be replaced by new pipes in one operation.

A further object of this invention is to provide devices attached to the cable of the said replacing assembly by means of which a pipe may be removed and a new pipe placed in position in one operation.

With these and other objects in view, this invention embraces broadly the concept of providing an assembly including a cable by means of which old pipe may be pulled and be replaced by new pipe in a single operation. One of the principal features of the invention is the method of threading the cable, to the end of which is attached a collar of larger diameter than the pipe, then exerting a tension on the free end of the cable thus withdrawing the pipe from the ground and leaving a slightly larger hole in the ground than originally occupied by the old pipe. The pulling collar is also provided with means for attaching one end of a new length of pipe to replace the old, this new pipe being drawn in as the old pipe is pulled out. By threading the cable through the old pipe and pulling it from its far end, all the pieces will be withdrawn should the pipe be broken.

When the pipe which is selected for replacing purposes is composed of a material which would be pulled apart in the operation described above, an extension cable is carried through the new pipe and a second device is fastened to this cable at the point where it emerges from the new pipe. This second device exerts pressure against the new pipe when the cable is tensioned and eliminates the possibility of the new pipe being pulled apart as it is drawn into position.

Figure 4:
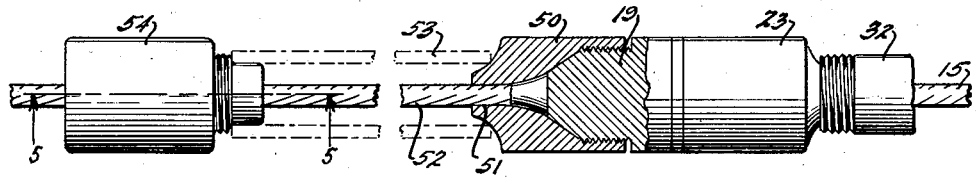

Figure 4 discloses a modification of the invention partly in cross section disclosing a second device attached to the pulling collar for withdrawing and replacing the old conduit.

Figure 5:
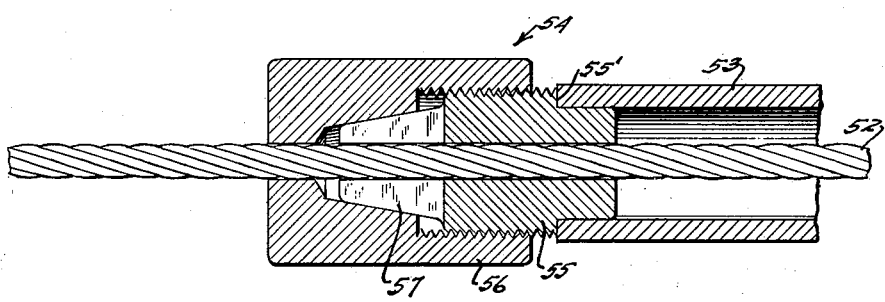

Figure 5 is a view taken along line 5—5 of Figure 4, looking in the direction of the arrows.

In order to illustrate the invention, the assembly has been shown in a position for replacing a section of pipe located beneath the curbing of a public highway. However, it is to be understood that the device can be used for withdrawing and replacing pipes located in any position either above or beneath the ground.

Figure 1:
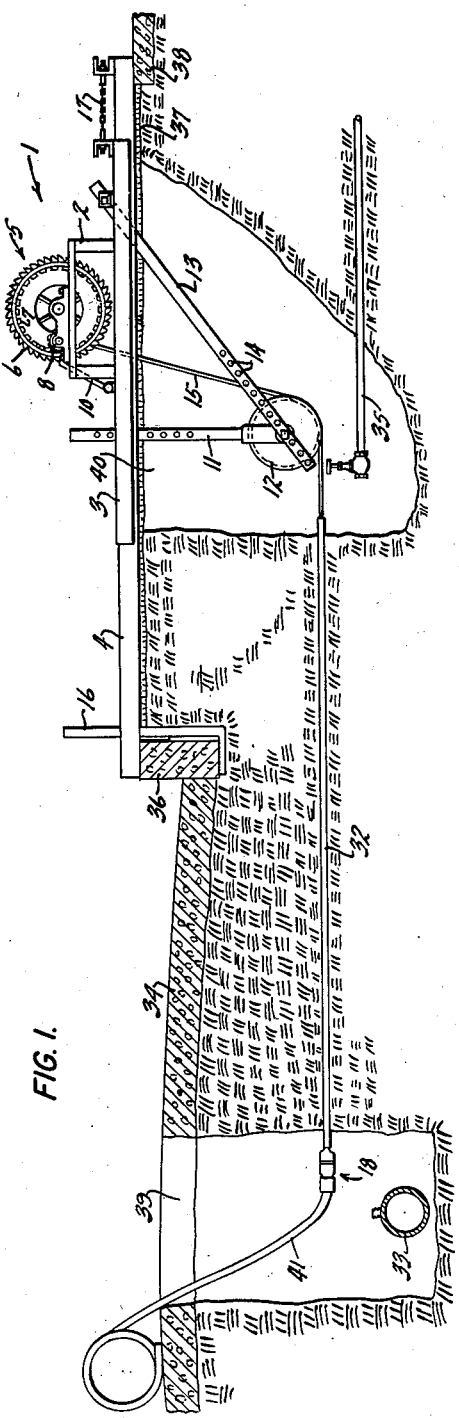
Figure 1 is a lateral sectional view through a portion of terrain showing the conduit drawing assembly in operative position.
Figure 2:
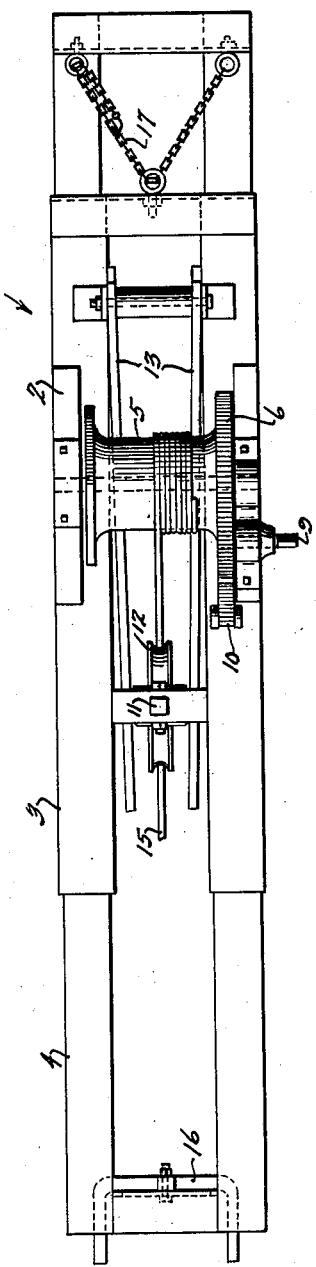
Figure 2 is a top plan view of the conduit drawing assembly.
Figure 3:
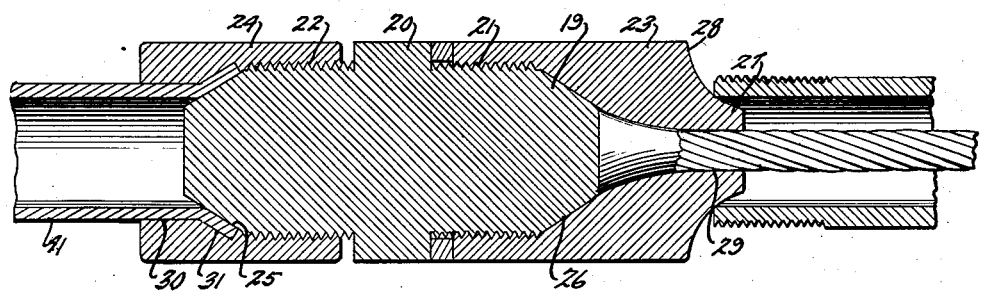
Figure 3 is a longitudinal sectional view of the pulling collar and new pipe coupling arrangement attached to the end of the cable.

As best shown in Figures 1 and 2, the pipe drawing assembly, generally designated by the numeral 1, comprises a winch 2 mounted on a pulley carriage 3 which is adjustably mounted on a carriage track 4. The winch 2 incorporates a drum 5 provided with flanged extremities.

The exterior surface of one of these flanges of the drum 5 is equipped with a series of ratchet teeth 6 and its interior surface is provided with a series of gear teeth 7. The drum 5 is revolved by a pinion gear 8 which engages the gear teeth 7. The pinion gear 8 is driven by any suitable mechanism such as a hand crank fitted on the stub shaft 9. The drum 5 may be held against rotation by a pawl 10 which is pivoted on the carriage 3 and engages the ratchet teeth 6.

In addition to the winch 2, the pulley carriage 3 supports an adjustable pulley arm 11 on the lower extremity of which is mounted a pulley 12. The pulley arm 11 is braced by pulley bars 13, one extremity of each of which is rigidly attached to the carriage 3. The other extremity of each of the pulley bars 13 is provided with a series of apertures 14 by means of which its length may be adjusted to accommodate an adjustment in the length of the pulley arm 11. A cable 15 which is employed to withdraw and replace the pipe passes around the pulley 12 and is attached at one end to the drum 5.

The carriage track 4 is provided with a tie rod 16 which is adapted to be driven into the ground or attached to some object to hold the assembly 1 in the desired position. The pulley carriage 3 is held in the desired position on the carriage track 4 against the force created when the cable 15 is placed under tension by a chain 17 which is connected to the carriage track 4.

The pipe pulling and replacing device 18 which forms the principal feature of this invention is attached to the extremity of the cable 15. This device 18 comprises a cylindrical connector 19 provided with a centrally located flange 20. The exterior surface of the connector 19 on either side of the flange 20 is provided with external screw threads 21 and 22 which are adapted to engage the internally screw-threaded cap 23 and collar 24 respectively. The extremities of the connector 19 are tapered as shown at 25 and 26.

The cap 23 is of larger diameter than the pipe to be replaced and is provided with a nose portion 27 and shoulders 28. It is also provided with a centrally located bore 29 through which passes the cable 15. The walls forming this bore are tapered to prevent the spread and filled end of the cable 15 from being separated from the cap 23.

The collar 24 is also provided with a centrally located aperture 30 which is of sufficient diameter to carry the replacement pipe. This aperture 30 is tapered to form, in conjunction with the tapered end 25 of the connector 19, an offset 31 which is adapted to engage the flange of 20 the pipe.

In order to illustrate the invention, there is shown in Figure 1 a feeder pipe 32 which is designed to connect a main conduit 33 located beneath the surface of the street 34 with a supply pipe 35 which extends beneath a curb 36, grass plot 37 and sidewalk 38 and is designed to supply a building which is not disclosed.

In practicing the invention, excavations 39 and 40 are made in the street 34 and the grass plot 37 respectively at points adjacent the extremities of the pipe 32. The pipe is then disconnected from the main conduit 33 and the supply pipe 35.

The pipe pulling and replacing device 1 is then positioned over the excavation 40 and the curb tie rod 16 is placed under the curb 36 to hold the device in position. The pulley carriage 3 is placed in the proper position on the carriage track 4 and the chain 17 is adjusted. The pulley arm 11 is then lowered until the periphery of the pulley 12 is approximately on a level with the pipe 32 and the pulley brace 13 is secured by a bolt passed through the selected aperture 14 to the pulley arm 11.

At this point the free end of the cable 15 is passed through the pipe 32 around the pulley 12 and attached to the drum 5. The collar 24 is fitted on the replacement pipe 41 and the end of this pipe is flared sufficiently to fit in the offset 31 after the collar 24 has been screwed in position on the connector 19.

The winch 2 is then operated thereby applying force to the cable 15 which is transmitted to the pipe 32 through the head of the cap 23. In this manner the pipe 32 is slowly withdrawn from the hole and wound around the drum 5. At the same time the shoulders 28 on the cap 23 enlarge the diameter of the hole and the replacement pipe 41 is slowly drawn into this enlarged bore.

After the pipe 32 has been withdrawn and has been replaced by the pipe 41, the connector 19 is detached and the collar 24 is attached directly to an elbow which is connected to the pipe 35. The collar 24 therefore is used both as a pipe drawer and a pipe joiner. The opposite extremity of the pipe 41 is also attached to the main 33.

The operation is completed by removing the assembly 1 from the excavation 40 and filling both excavations. The cable and pipe 32 may then be removed from the drum 5.

Although the device 18 which has previously been described is suitable for use when the replacement pipe 41 is composed of a material which will not pull apart, such as copper, or steel, a pipe composed of materials such as lead can also be used, especially if it is drawn into position by hand. This is due to the fact that there is very little friction on the new pipe that replaces the old as the collar that withdraws the old pipe sufficiently enlarges the hole to allow the replacement pipe to be readily drawn into position. However, in order to eliminate the possibility of a replacement pipe made up of materials such as lead being pulled apart during the replacing operation, a modification of the invention has been provided as shown in Figures 4 and 5.

In this modification the cable 15 is held in position against the connector 19 by the cap 23 in the manner which has previously been described. However, a cap 50 which is identical to the cap 23 is attached on the opposite end of the connector 19 in place of the collar 24. This cap 50 is provided with a central bore 51 which is identical to the bore 29 in the cap 23 and through which extends a second cable 52, the spread and filled end of which is held in position against the tapered sides of the bore 51. The cable 52 extends through the replacement pipe 53 and is detachably connected at the point where it emerges from the pipe 53 with a pulling device 54.

The pulling device 54 consists of a collet 55 provided with external threads adapted to engage an internally threaded draw-up nut 56. Both the collet 55 and the nut 56 are provided with aligned bores through which extends the cable 52.

The bore in the nut 56 is tapered to receive the split tapered extremity 57 of the collet 55. The opposite extremity of the collet 55 is reduced to fit in the bore of the replacement pipe 53 and is provided with shoulders 55' which abut the periphery of the end of the pipe.

By means of this construction the device 54 can be placed at the position where the cable 52 emerges from the pipe 53, and after the reduced end of the collet is placed in the bore of the pipe 53, the device 54 may be held in position by tightening the nut 56, thereby causing the tapered channel to close the split end of the collet 55 so as to frictionally engage the cable 52.

It is believed apparent that by means of this construction, when tension is exerted on the cable 15, the pipe 32 will be withdrawn in the manner previously described and that the bore of the hole will be increased by the action of the shoulders 28 of the cap 23. Moreover, by this action tension is placed on the second cable 52 by means of which force is applied through the shoulders 55' to the extremity of the replacement pipe 53. In this manner the pipe 32 is gradually withdrawn from the ground and wrapped around the drum 5 and the replacement pipe 53 is drawn into position. The pipe 53 is then connected, the excavations filled, and the equipment removed in the manner previously described.

It is believed apparent from the above description that by means of this device pipes may be replaced with larger and smaller pipe with the expenditure of very little labor and material compared to the old method in which a trench was dug the entire length of the pipe to be replaced. Moreover, the pipe may be replaced by the use of this machine without seriously affecting traffic on the street or roadway.

Although for purposes of illustration the replacing of one type of pipe has been disclosed, it is obvious that pipes located in any position may be withdrawn without difficulty. Moreover, various mechanical changes by those skilled in the art may be made in the pulling apparatus and the devices attached to the cable without departing from the invention.

It is therefore to be understood that this invention is only limited by the prior art and the scope of the appended claims.

I claim:

1. A pipe pulling and replacing assembly comprising a winch, a cable passing through the pipe to be pulled, and a pipe pulling device attached to the extremity of the cable, said device being of greater diameter than the pipe to be replaced and being provided with means to grip the replacement pipe, whereby the pipe to be replaced will be withdrawn and the replacement pipe pulled into position by movement of the cable towards the winch.

2. A pipe pulling and replacing assembly comprising a winch, a cable passing through the pipe to be pulled, and a pipe pulling device attached to the extremity of the cable, said device comprising a core, a cap mounted on the core adjacent the pipe to be replaced, said cap being of larger diameter than the core, and a collar mounted on the opposite extremity of the core, said collar being provided with a channel through which the replacement pipe extends, and said replacement pipe being held in position against the core by the said collar, whereby the pipe to be replaced will be withdrawn and the replacement pipe pulled into position by movement of the cable towards the winch.

3. A pipe pulling and replacing assembly comprising a track, a pulley carriage mounted on the track, a winch, and a pulley mounted on the pulley carriage, a cable attached to the winch and passing around the pulley, said cable passing through the pipe to be pulled, a pipe pulling device attached to the extremity of the cable, said device being of greater diameter than the pipe to be replaced, and means associated with the device to grip the replacement pipe, whereby the pipe to be replaced will be withdrawn and the replacement pipe pulled into position by movement of the cable towards the winch.

4. A pipe pulling and replacing assembly comprising a track, a pulley carriage mounted on the track, a winch, and a pulley mounted on the pulley carriage, a cable attached to the winch and passing around the pulley, said cable passing through the pipe to be pulled, a pipe pulling device attached to the extremity of the cable, said device comprising a core, a cap mounted on the core adjacent the pipe to be replaced, said cap being of larger diameter than the core, and a collar mounted on the opposite extremity of the core, said collar being provided with a channel through which the replacement pipe extends, and said replacement pipe being held in position against the core by the said collar, whereby the pipe to be replaced will be withdrawn and the replacement pipe pulled into position by movement of the cable towards the winch.

5. A device for replacing conduits when attached to a cable comprising a cylindrically shaped core, a cap and a collar detachably mounted on the opposite end of the core, centrally located channels in both the cap and collar adapted to receive the cable and the replacement pipe respectively, the walls surrounding the channel of said cap being tapered to engage the spread and filled extremity of the cable, the walls of the channel of said collar being tapered to form with the tapered extremity of the core an offset adapted to engage the flared end of the replacement pipe.

6. A pipe pulling and replacing assembly comprising a cable tensioning device, a cable attached to the tensioning device and passing through the pipe to be pulled, and a pipe pulling device attached to the cable at the point where it emerges from the extremity of the pipe which is furtherest removed from the tensioning device, said pulling device being of greater diameter than the pipe and adapted to bear against said extremity of the pipe to be replaced and provided with means adapted to engage the replacement pipe whereby the pipe to be replaced will be withdrawn and the replacement pipe pulled into position by a movement of the cable caused by tension exerted on the cable by the tensioning device.

JOHN E. RAINWATER.